United States Patent
Couckuyt et al.

(10) Patent No.: US 10,496,630 B2
(45) Date of Patent: Dec. 3, 2019

(54) READ-WRITE PROTOCOL FOR APPEND-ONLY DISTRIBUTED DATABASES

(71) Applicant: Microsoft Technology Licensing, LLC., Redmond, WA (US)

(72) Inventors: Jeffrey Darren Couckuyt, Bothell, WA (US); Joseph Schwartz, Redmond, WA (US); Sergey Y. Galuzo, Woodinville, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 923 days.

(21) Appl. No.: 15/042,120

(22) Filed: Feb. 11, 2016

(65) Prior Publication Data

US 2017/0097953 A1    Apr. 6, 2017

Related U.S. Application Data

(60) Provisional application No. 62/235,902, filed on Oct. 1, 2015.

(51) Int. Cl.
G06F 16/30       (2019.01)
G06F 16/23       (2019.01)
G06F 16/2458     (2019.01)

(52) U.S. Cl.
CPC ...... *G06F 16/2358* (2019.01); *G06F 16/2308* (2019.01); *G06F 16/2365* (2019.01); *G06F 16/2379* (2019.01); *G06F 16/2471* (2019.01)

(58) Field of Classification Search
CPC .................................................. G06F 16/2471
(Continued)

(56) References Cited

U.S. PATENT DOCUMENTS 6,769,003 B2   7/2004  Park et al.
6,970,911 B2  11/2005  Inaba
(Continued)

FOREIGN PATENT DOCUMENTS

CN      1232914 C      12/2005
WO   2013103720 A1      7/2013
WO   2013184712 A2     12/2013

OTHER PUBLICATIONS

Marcus, Adam, "The NoSQL Ecosystem", Published on: May 26, 2011, Available at: http://www.aosabook.org/en/nosql.html.
(Continued)

*Primary Examiner* — Baoquoc N To
(74) *Attorney, Agent, or Firm* — Merchant & Gould

(57) ABSTRACT

Performing a distributed database transaction using parallel writes to a distributed append-only database system is provided. A central database and a plurality of distributed databases, also known as "shards", may be used. A request made to implement a distributed transaction, requiring updates to one or more shards, results in a monotonically increasing identification (ID) number being assigned to a change set. The request and change set may be registered at the central database. Once the change set is completely written to all of the appropriate shards, the change set is marked as completed in the central database. After write completion, a change set ID boundary at the central database is advanced to indicate the current fully changed status of the distributed database.

20 Claims, 7 Drawing Sheets

(58) Field of Classification Search
USPC .......................................................... 707/803
See application file for complete search history.

(56) References Cited

U.S. PATENT DOCUMENTS

| | | | |
|---|---|---|---|
| 8,495,017 | B2 | 7/2013 | Lafont et al. |
| 8,666,939 | B2 | 3/2014 | O'Krafka et al. |
| 2004/0024795 | A1* | 2/2004 | Hind ..................... G06F 16/275 |
| 2005/0095774 | A1* | 5/2005 | Ushiku ............. G05B 19/4184 438/222 |
| 2006/0036660 | A1 | 2/2006 | Lynn |
| 2009/0265361 | A1* | 10/2009 | Nagami ................ G06F 9/5072 |
| 2010/0138391 | A1* | 6/2010 | Namikawa .............. G06F 16/21 707/640 |
| 2011/0010513 | A1 | 1/2011 | Burr et al. |
| 2011/0252181 | A1 | 10/2011 | Ouye et al. |
| 2013/0262403 | A1* | 10/2013 | Milousheff ......... G06F 16/2365 707/691 |
| 2013/0311426 | A1 | 11/2013 | Erdogan et al. |
| 2014/0033036 | A1* | 1/2014 | Gaur .................. H04N 21/4532 715/719 |
| 2014/0279917 | A1 | 9/2014 | Minh et al. |
| 2014/0280172 | A1 | 9/2014 | Amir et al. |
| 2015/0261805 | A1 | 9/2015 | Lee et al. |

OTHER PUBLICATIONS

Pachitariu, George, "Data Replication Algorithms in Distributed Databases", In Master's Thesis of Science, Sep. 28, 2014, 58 pages.
"Oracle NoSQL Database", Published on: Mar. 18, 2015, Available at: http://www.oracle.com/technetwork/database/nosqldb/overview/ondb-cassandra-hbase-2014-2344569.pdf.
"MongoDB One Way Replication", Retrieved on: Sep. 9, 2015, Available at: http://qnalist.com/questions/5238718/mongodb-one-way-replication.
"Activity: NoSQL Cluster (Mongo Sharding)", Retrieved on: Sep. 9, 2015, Available at: http://hssl.cs.jhu.edu/wiki/doku.php?id=cs423:xniu7:assignment4.
"Which database should I use for a killer web application: MongoDB, PostgreSQL, or MySQL?", Retrieved on: Sep. 9, 2015, Available at: http://www.quora.com/Which-database-should-I-use-for-a-killer-web-application-MongoDB-PostgreSQL-or-MySQL.
"International Search Report and Written Opinion Issued in PCT Application No. PCT/US2016/053641", dated Dec. 21, 2016, 11 Pages.
"International Preliminary Report on Patentability Issued in PCT Application No. PCT/US2016/053641", dated Dec. 14, 2017, 9 Pages.
"Second Written Opinion Issued in PCT Application No. PCT/US2016/053641", dated Sep. 27, 2017, 8 Pages.

* cited by examiner

READ-WRITE PROTOCOL FOR APPEND-ONLY DISTRIBUTED DATABASES

CROSS-REFERENCE TO RELATED APPLICATIONS

This application claims priority from U.S. Provisional Application No. 62/235,902, filed Oct. 1, 2015, and entitled "Read-Write Protocol for Append-Only Distributed Databases," which is herein incorporated by reference.

BACKGROUND

Distributed databases may provide for storage of related data in multiple database devices. This may particularly be useful with data-intensive applications that store quantities of data which cannot typically be handled by a single database device. For example, it may be desirable to distribute data relating to geographical items (roads, intersections, individual addresses, etc.) for mapping applications among multiple database devices. As the number of defined geographical items desired to be stored may require a massive amount of database memory, distributing the geographical items across a distributed database comprising multiple database devices may be preferred. While generic distributed databases may be used to store such data, present systems may not provide for accurate results during parallel writes for transactions that implement changes across multiple database devices.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of systems and methods for performing a distributed database transaction using parallel writes to a distributed append-only database system are disclosed. According to various aspects, the distributed database may comprise a central database and a plurality of distributed databases (it should be understood that "database" and "shard" may be used interchangeably within the present disclosure). A request may be made to implement a change set (distributed transaction) requiring updates to one or more shards located remotely from one another. When the change set is received, a monotonically increasing identification number may be assigned to the change set and registered at the central database. Throughout the present disclosure, such an identification number may be referred to as a "change set ID." The change set may be written to all implicated shards in parallel. For example, each data change set may be appended to tables in the appropriate shards. The change set ID may be used as a component of primary keys used by the underlying data tables. Once the change set is completely written to all of the appropriate shards, the change set may be marked as completed in the central database. After change set completion, a visible change set ID boundary at the central database may be advanced to indicate the current fully changed status of the distributed database.

The details of one or more aspects are set forth in the accompanying drawings and description below. Other features and advantages will be apparent from a reading of the following detailed description and a review of the associated drawings.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout several views.

DETAILED DESCRIPTION

Figure 1:
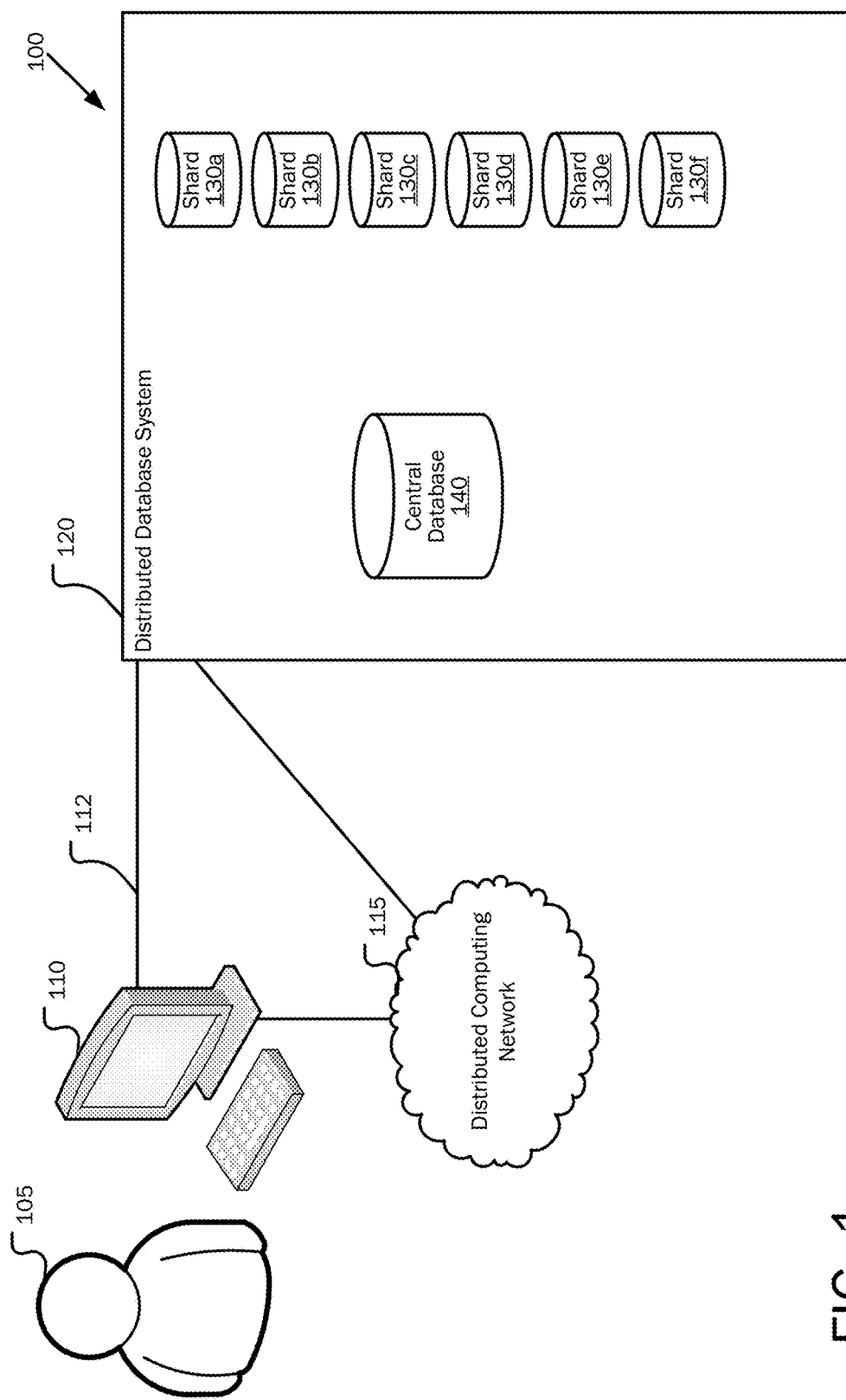
FIG. 1 is a block diagram illustrating a system for performing distributed database transactions.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is non-limiting, and instead, the proper scope is defined by the appended claims. Examples may take the form of a hardware implementation, or an entirely software implementation, or an implementation combining software and hardware aspects. The following detailed description is, therefore, not to be taken in a limiting sense.

For purposes of illustration and understanding, aspects disclosed herein are discussed with reference to implementing enterprise transactions in a distributed database system. As will be appreciated from the disclosure set out herein, aspects of the present disclosure are useful with respect to distributed database systems containing append-only shards for data storage, wherein the data are written to the shards in parallel and consistent reads can be provided at any stage in that process.

In a distributed database system, it may be desired to write multiple pieces of data in multiple places and, until writing of these pieces is completed, still provide readers with a consistent view of the data from before the write. Aspects of the present disclosure allow for a way to achieve this goal via parallel writing of the multiple pieces of data (i.e., a change set) that comprise a distributed transaction.

Each distributed transaction has certain properties that are important when maintaining consistency for readers of database information. For example, a distributed transaction may comprise the required database updates to effectuate a transfer of assets from one account to the other. A first change may be required on a first shard to decrease the amount of assets in the transmitting account by a particular amount. A second change may be required on a second shard to increase the amount of assets in the receiving account by that particular amount. It is desired that the distributed database system (which contains both the first shard and the second shard) guarantees that internal states are never visible to a reader of the data. In other words, when the write of the first and second change are completed successfully, both accounts will contain the right amounts, and the changes may then be made visible to a reader. If the write does not completely succeed, aspects of the present disclosure allow for a return to the previous state of the account based on the visible change set ID boundary.

Aspects of the present disclosure deal with updating a distributed database system, where the individual shards operate via append-only updates. For example, when a first change may be required on a first shard, to decrease the amount of assets in a transmitting account as discussed above, the system performs a write on the first shard, but not an overwrite. This feature allows previous states of data to be maintained for rollbacks to previous data states, and other purposes.

Another example change set involves updating geographical items for a mapping application. A mapping application may be updated with large numbers of geographical items at once (e.g., 15 million new roads). Writing all of the new data into the distributed database system may take a significant period of time. If a reader wants to build a map while this transaction is processing, it is not desirable to allow a reading of some of the new data, but not all of the new data. In such a scenario, aspects of the present disclosure will direct a reader to the pre-update version of the data, based on the visible change set ID boundary, until the entire write is completed and the visible change set ID boundary is advanced. Such aspects avoid the need for blocking readers from the distributed database system during writes, as well as blocking writers from over-writing data that are currently being read or interrupting an on-going read.

Each set of writes is identified with a change set ID. In some aspects, the change set ID is associated with a particular date or time of the write, but may also be a sequential record of writes. The resulting state of a shard may then be read similarly to a ledger. For example, going back to the mapping application example, a change set may include a change in the location of an intersection between two roads. Such a change may require a write to one shard containing information regarding the first road and a write to a second shard containing information regarding the second road, which intersects the first road. A parallel write would then need to be performed on both the first shard and second shard to accurately update the intersection information.

Each shard is then appended with the new road information. The change set ID for each appending will be the same, as the change set IDs are assigned by a central database. Upon successful completion of the two appending writes, the transaction becomes visible by advancing the visible change set ID boundary at the central database. Prior to advancing the visible change set ID boundary, readers may access only information associated with the non-advanced visible change set ID boundary, enabling the readers to view the database world how it was before this transaction, and without being blocked from the distributed database system. If an error occurs during the parallel writes, the data in the first and second shards may be rolled back to the data associated with the non-advanced visible change set ID boundary (i.e., a previous version of the data).

Referring now to the drawings, FIG. 1 is a block diagram illustrating a system for implementing distributed database coordination according to aspects of the present disclosure. A user 105 is illustrated in association with a computer 110 with which the user may operate a variety of software applications for reading information from and writing information to a distributed database system 120, with which the services of distributed database coordination as disclosed herein may be applied.

As illustrated in FIG. 1, the computer 110 may communicate with distributed database system 120 via a direct data link 112 or via a distributed computing network 115, such as the Internet or a corporate or other entity intranet. The distributed database system 120 is illustrative of a collection of computer systems at which distributed database coordination may be applied. The distributed database system 120 may comprise any number of databases, such as shards 130a to 130f (generally, shards 130). Shards 130a to 130f may each be located remotely from one another.

The distributed database system 120 may further comprise a central database 140, which coordinates processes operating outside of the distributed database system 120 with the distributed database system 120 and with shards 130a to 130f. According to aspects of the present disclosure, the central database 140 may store metadata about the data items stored in the distributed shards 130a to 130f One of the pieces of metadata in this central database 140 is a visible version of the data defined by a visible change set ID boundary.

As should be appreciated, the distributed database system 120 may be illustrative of one or more computing systems operating together as a backend data storage system for a company, educational system or other entity, or the distributed database system 120 may be illustrative of one or more computers or collections of computers operating in a cloud-based data center at which a distributed database transaction may be performed for users 105.

Shards 130a to 130f may be illustrative of general purpose data storage units or systems for processing a distributed database transaction sent by, accessed by, or otherwise communicated to or from the user 105 in association with a distributed database transaction. Received inputs, for example, enterprise transactions, may be stored in shards 130a to 130f, and associated metadata for the distributed transaction may be stored in the central database 140.

According to aspects, the components of the distributed database system 120 are illustrated and described above as a system of components operating remotely from a user's computer 110. That is, the components of the distributed database system 120 may operate as a standalone system of computing devices that may be called upon by a user's computer 110 for in association with a distributed database transaction as described herein.

The computer 110, the distributed database system 120, the shards 130a to 130f, and the central database 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

Figure 2A:
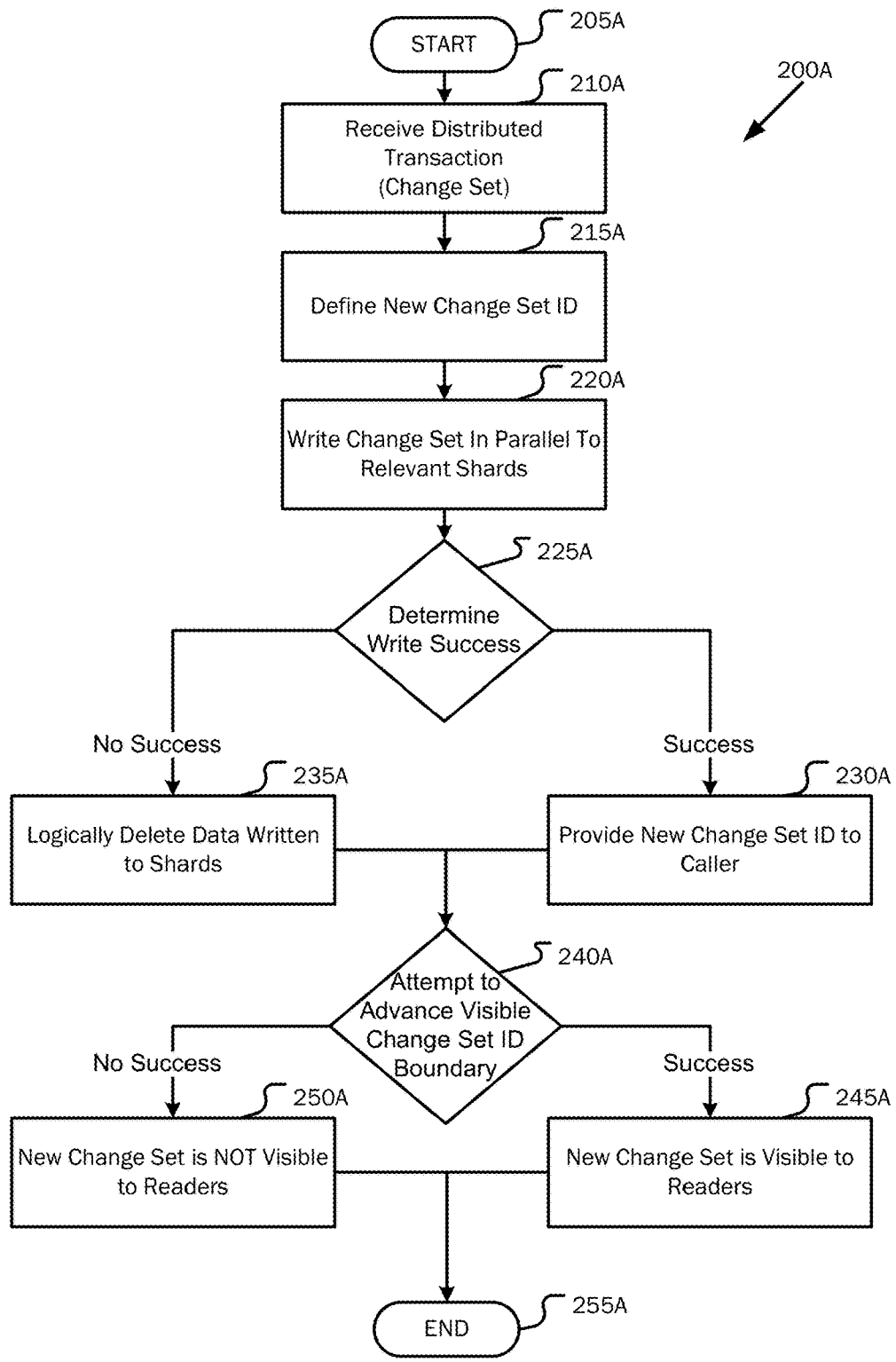
FIG. 2A is a flowchart showing general stages involved in an example method for performing a distributed database transaction.

Having described an example architecture and other aspects of the present disclosure above with reference to FIG. 1, FIG. 2A is a flowchart showing general stages involved in an example method for executing an improved distributed database transaction. As mentioned above, aspects of the present disclosure may be used for efficiently writing in a distributed database system, which also enable consistent reads. For purposes of description, the methods set out below are described in terms of updating a distributed database system 120 comprising append-only shards 130, but the description of these aspects with respect to distributed transactions should not be taken as limiting, but for purposes of illustration and description only.

Referring then to FIG. 2A, the method 200A begins at start operation 205A and proceeds to operation 210A, where a distributed transaction (change set) is received from a particular user, such as user 105, who may provide the change set to be implemented by the distributed database system 120. For example, the distributed transaction may contain a number of geographical data items to update a mapping application serviced by the distributed database system 120.

At operation 215A, a new change set ID is defined for the received distributed transaction at a central database 140 in the distributed database system 120. The previously visible version for all records is defined in the central database 140 by a visible change set ID boundary. For example, the visible change set ID boundary may equal 100. As such, the central database 140 will assign the received distributed transaction a change set ID incrementally larger than the visible change set ID boundary. For example, in this case, the central database 140 will set the change set ID equal to 101 for the received distributed transaction.

At operation 220A, the distributed transaction is written to the appropriate shards 130, in parallel. The appropriate shards 130 are the append-only shards 130 that require an update that is based on the distributed transaction, for example, shards 130a to 130f may each be implicated by an distributed transaction. At operation 225A, the central database 140 determines whether the writes were successfully completed to the shards 130. When a successful write is determined, method 200A proceeds to operation 230A, where the new change set ID is provided to a caller. In some aspects of the present disclosure, the central database 140 may be informed of the successful completion of writing a change set by receiving successful responses from each of the implicated shards 130. Method 200A then proceeds to operation 240A.

Alternatively, if it is determined that the write did not succeed, for example, if one or more of the shards 130 fail to provide a successful response within a timeout period for the append procedure related to a piece of data in change set with the change set ID of 101, or a failure message is received, method 200A proceeds to operation 235A, where the change set is logically deleted from the shards 130 to which it was written; freeing memory for a later write without disturbing the order of writes. Because the visible change set ID boundary is the maximum change set, below which all change sets were successfully completed, a logical delete enables the database 140 to later write over any data from an unsuccessful write in an append only shard without wasting any memory in its storage devices. Method 200A then proceeds to operation 240A.

At operation 240A, the central database 140 attempts to advance the visible change set ID boundary. In some aspects, the visible change set ID boundary is advanced to the most recently completed change set ID. In this example, central database 140 may advance the visible change set ID boundary to the completed change set ID of 101. The visible change set ID boundary shows the maximum change set ID of a completed change set, below which all change sets are completed. If the write successfully completed, method 200A proceeds to operation 245A, otherwise, if the write did not successfully complete, method 200A proceeds to operation 250A.

At operation 245A, the new change ID is provided to readers, such as user 105, by which the readers may access the distributed database system 120 for a consistent view of the data, for example, through a mapping application. For example, the user 105 may wish to build a map of a particular geographical area. The data required to build this map may include data stored throughout the distributed database system 120 in shards 130a to 130f. At operation 245A, the central database 140 provides new visible change set ID boundary to the user 105. User 105 may read the most recent records (those with highest change set ID) up to the new visible change set ID boundary. This ensures that user 105 has access to all data including the transactions defined in change set having change set ID 101 and that all data provided is consistent. The method 200A concludes at end operation 255A.

At operation 250A, the new change set ID is not visible to the readers. In various aspects, the database may reuse the change set ID from the unsuccessful write for the next change set, which will overwrite any data present after the last change set boundary and maintain a sequential order of change set IDs; retaining the new change set ID for a successful write. The method 200A concludes at end operation 255A.

Figure 2B:
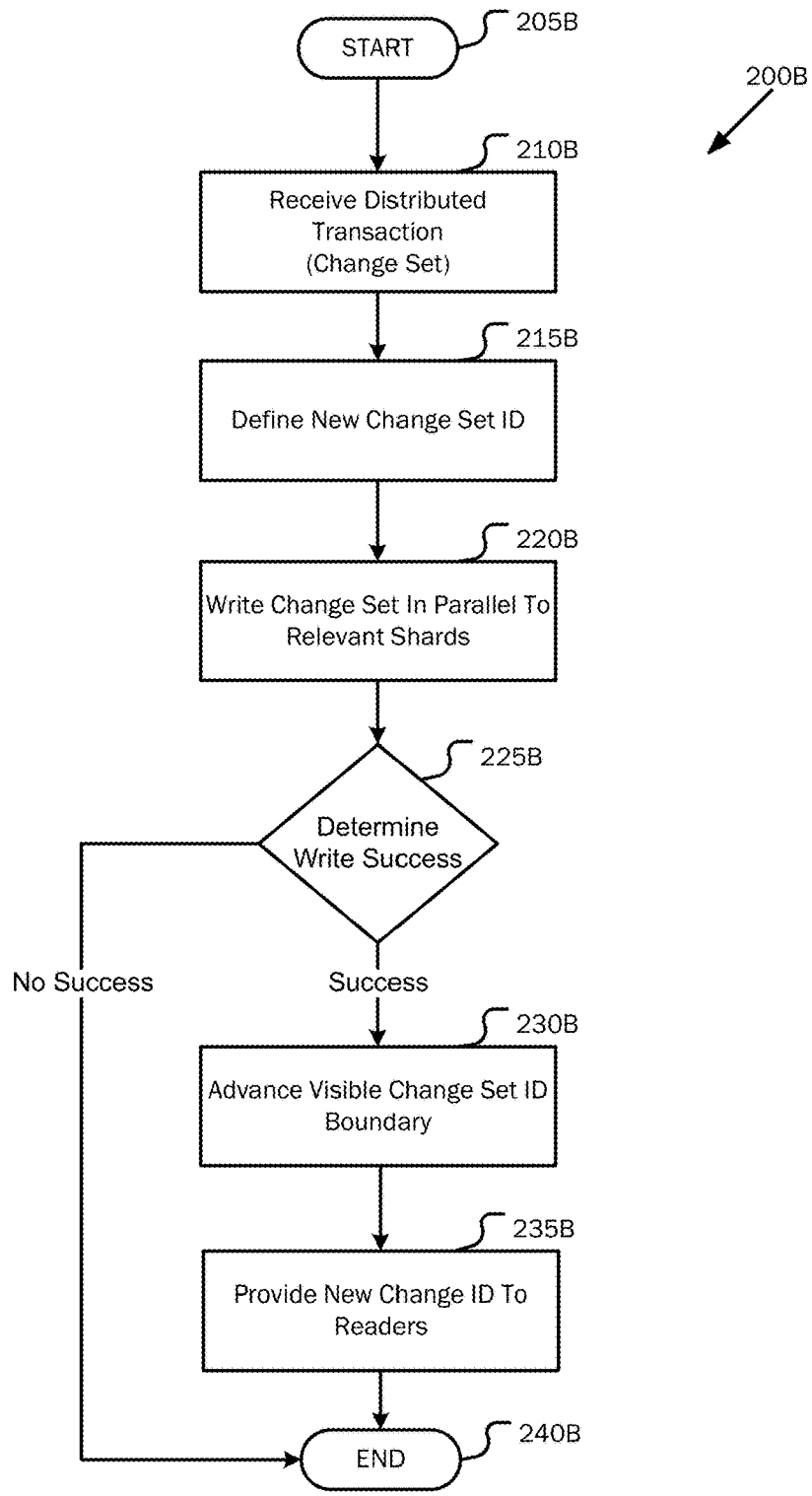
FIG. 2B is a flowchart showing general stages involved in an alternate example method for performing a distributed database transaction.

Having described an example architecture and other aspects of the present disclosure above with reference to FIG. 1, FIG. 2B is a flowchart showing general stages involved in an alternate example method for executing an improved distributed database transaction to the method discussed in regard to FIG. 2A. As mentioned above, aspects of the present disclosure may be used for efficiently writing in a distributed database system, which also enable consistent reads. For purposes of description, the methods set out below are described in terms of updating a distributed database system 120 comprising append-only shards 130, but the description of these aspects with respect to distributed transactions should not be taken as limiting, but for purposes of illustration and description only.

Referring then to FIG. 2B, the method 200B begins at start operation 205B and proceeds to operation 210B, where a distributed transaction (change set) is received from a particular user, such as user 105, who may provide the change set to be implemented by the distributed database system 120. For example, the distributed transaction may contain a number of geographical data items to update a mapping application serviced by the distributed database system 120.

At operation 215B, a new change set ID is defined for the received distributed transaction at a central database 140 in the distributed database system 120. The previously visible version for all records is defined in the central database 140 by a visible change set ID boundary. For example, the visible change set ID boundary may equal 100. As such, the central database 140 will assign the received distributed transaction a change set ID incrementally larger than the visible change set ID boundary. For example, in this case, the central database 140 will set the change set ID equal to 101 for the received distributed transaction.

At operation 220B, the distributed transaction is written to the appropriate shards 130, in parallel. The appropriate shards 130 are the append-only shards 130 that require an update that is based on the distributed transaction, for example, shards 130a to 130f may each be implicated by an distributed transaction. At operation 225B, the central database 140 determines whether the writes were successfully completed to the shards 130. When a successful write is determined, method 200B proceeds to operation 230B. In some aspects of the present disclosure, the central database 140 may be informed of the successful completion of writing a change set by receiving successful responses from each of the implicated shards 130. Alternatively, if it is determined that the write did not succeed, for example, if one or more of the shards 130 fail to provide a successful response for the append procedure related to a piece of data in change set with the change set ID of 101, method 200B proceeds to end operation 240B and concludes. In other aspects of the present disclosure, a timeout functionality may be employed to indicate that a write is unsuccessful if a successful response is not received for a predetermined period of time.

At operation 230B, the central database 140 advances the visible change set ID boundary. In some aspects, the visible change set ID boundary is advanced to the most recently completed change set ID. In this example, central database 140 may advance the visible change set ID boundary to the completed change set ID of 101.

At operation 235B, the new change ID is provided to readers, such as user 105, by which the readers may access the distributed database system 120 for a consistent view of the data, for example, through a mapping application. For example, the user 105 may wish to build a map of a particular geographical area. The data required to build this map may include data stored throughout the distributed database system 120 in shards 130a to 130f. At operation 235B, the central database 140 provides new visible change set ID boundary to the user 105. User 105 may read the most recent records (those with highest change set ID) up to the new visible change set ID boundary. This ensures that user 105 has access to all data including the transactions defined in change set having change set ID 101 and that all data provided is consistent. The method 200B concludes at end operation 240B.

Figure 3:
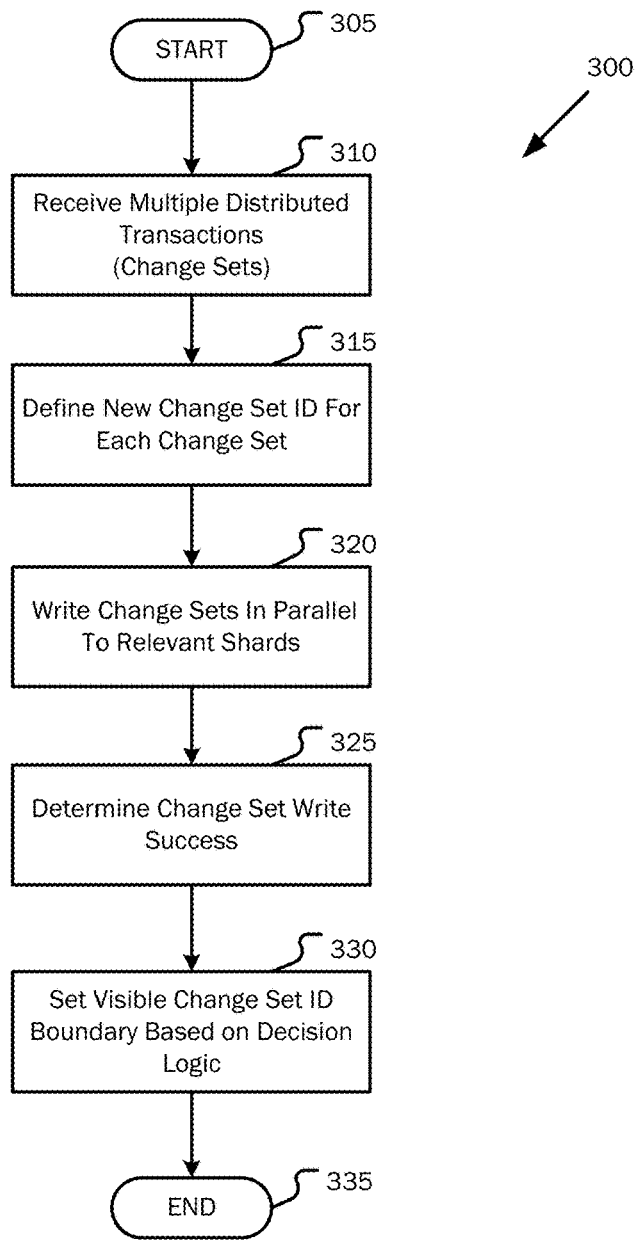
FIG. 3 is a flowchart showing general stages involved in an example method for performing multiple simultaneous distributed database transactions.

Having described an example architecture and other aspects of the present disclosure above with reference to FIG. 1, FIG. 3 is a flowchart showing general stages involved in an example method for a distributed database transaction. As mentioned above, aspects of the present disclosure may be used for the efficient writing to, and consistent reading from, a distributed database system 120.

Referring then to FIG. 3, the method 300 begins at start operation 305 and proceeds to operation 310. Going back to the previous example, there may be instances where more than one change set is being implemented at the same time. For example, at operation 310, the distributed database system 120 may receive separate distributed transactions (change sets) from one or more users 105. For example, each distributed transaction may relate to items to update a mapping application serviced by the distributed database system 120.

At operation 315, a new change set ID is defined separately for each of the two received distributed transactions at a central database 140 in the distributed database system 120. The previously visible version for all records may again be defined in the central database 140 by a visible change set ID boundary. For example, the visible change set ID boundary may equal 100. As such, the central database 140 may assign for the first distributed transaction a change set ID incrementally larger than the visible change set ID boundary. For example, in this case, the central database 140 may set the change set ID for the first distributed transaction equal to 101. The central database 140 may then assign the second distributed transaction a change set ID incrementally larger than change set ID assigned to the first change set. For example, in this case, the central database 140 may set the change set ID for the second distributed transaction equal to 102.

At operation 320, the change sets are written in parallel to the relevant shards 130. Implementing writes for the two change sets may result in writing information from the two transactions to a number of shards 130, such as shards 130a to 130f, at the same time at parallel rates. In this example, it may be assumed that writing change set ID 102 completes prior to the completion of writing change set ID 101. This may be due to change set ID 101 being a more complex change set or even due to delays on various network connections to the respective shards 130.

At operation 325, the success of each of the writes for the change sets are determined. For example, the central database 140 may be informed that change set ID 102 is complete and change set ID 101 is still processing (has not yet succeeded). At operation 330, the central database 140 uses decision logic to determine how and whether to advance the visible change set ID boundary when at least one change set ID has not succeeded, for example, while change set ID 101 is still processing but change set ID 102 has successfully been written. Advancing the visible change set ID boundary without the decision logic may cause continuity issues because there are records in the system that have not completed writing yet. In some aspects of the present disclosure, the visible change set ID may remain at the previous value (in the example, at 100) and the readers may be notified that a completed change set ID (in the example, 102) is available for reading. In some aspects, a completed change set ID (in the example, 102) may be hidden from potential readers until the central database 140 has been informed that the writing of a previously received, yet ongoing change set ID write (in the example, 101) has been completed. The method 300 concludes at end operation 335.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which aspects are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
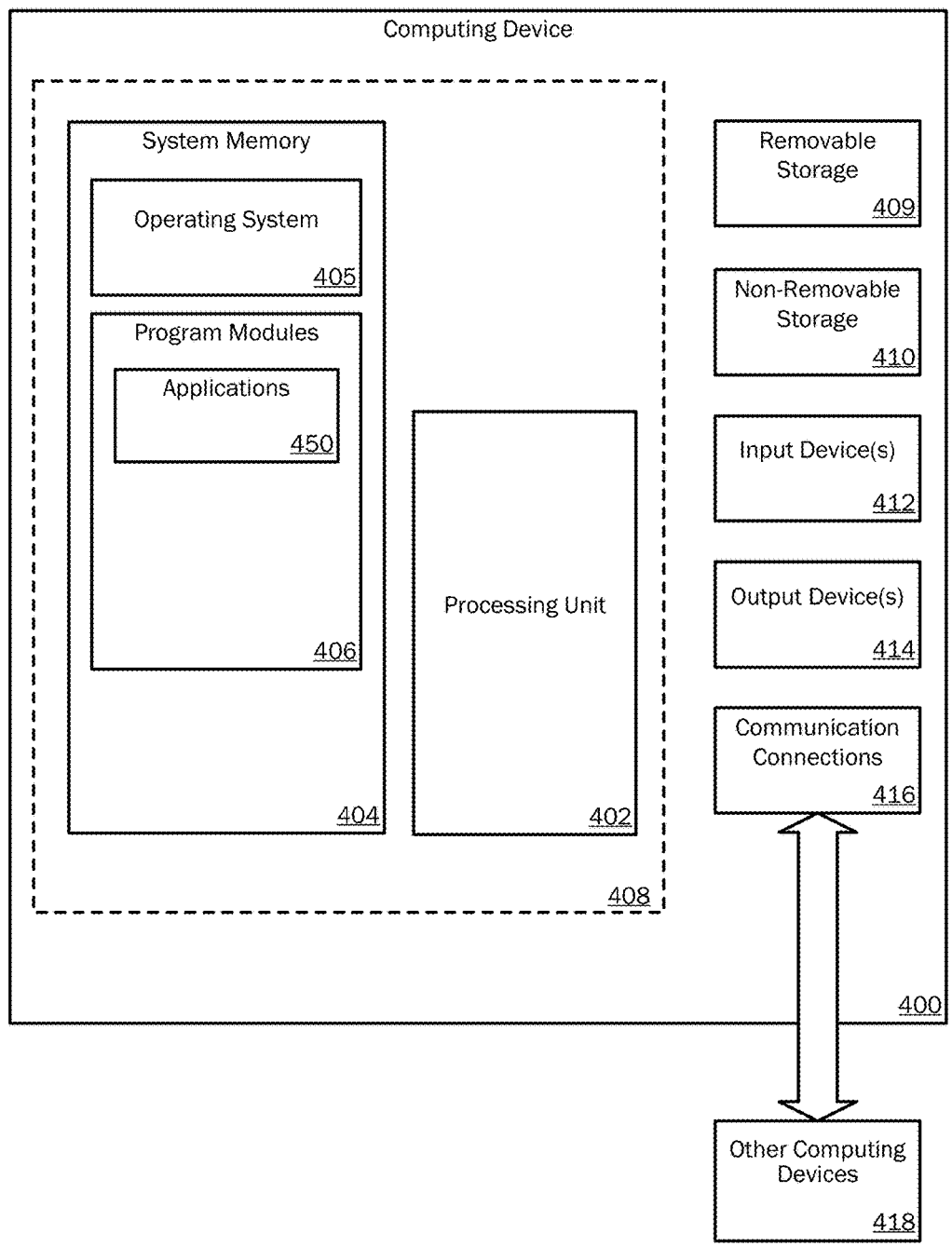
FIG. 4 is a block diagram illustrating one example of the physical components of a computing device.
Figure 5A:
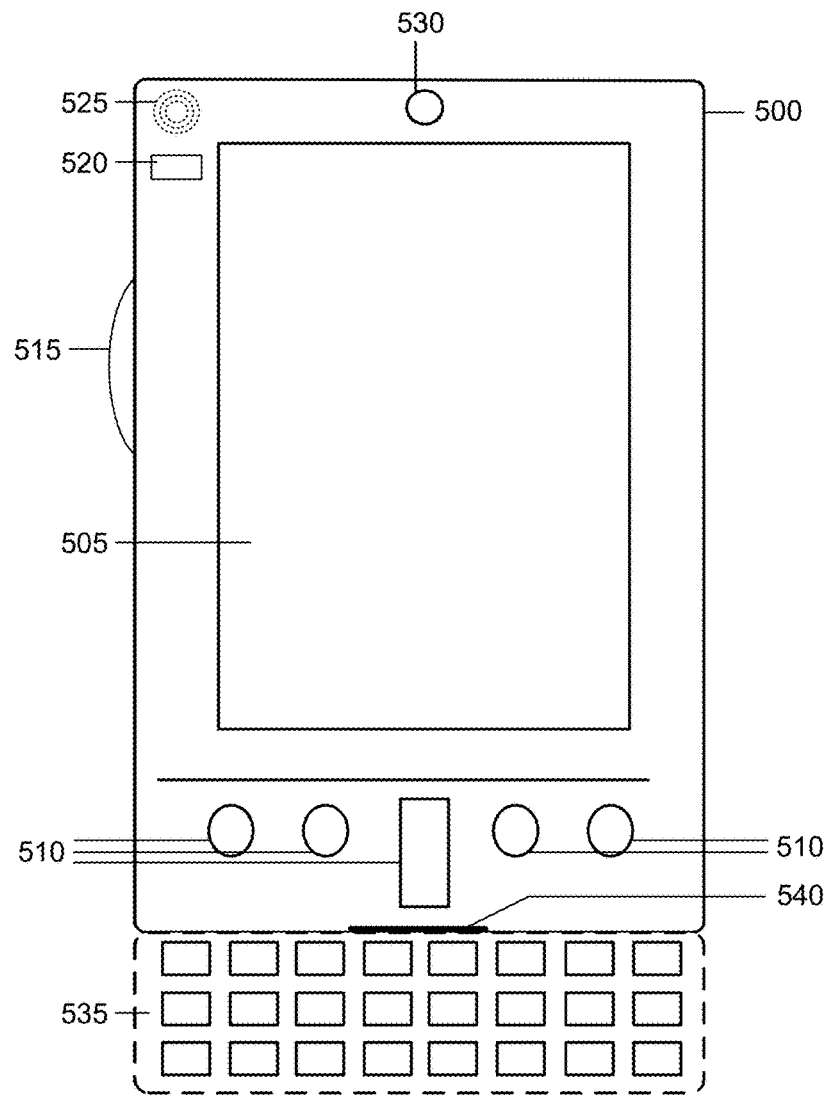
FIGS. 5A and 5B are block diagrams of a mobile computing device.
Figure 5B:
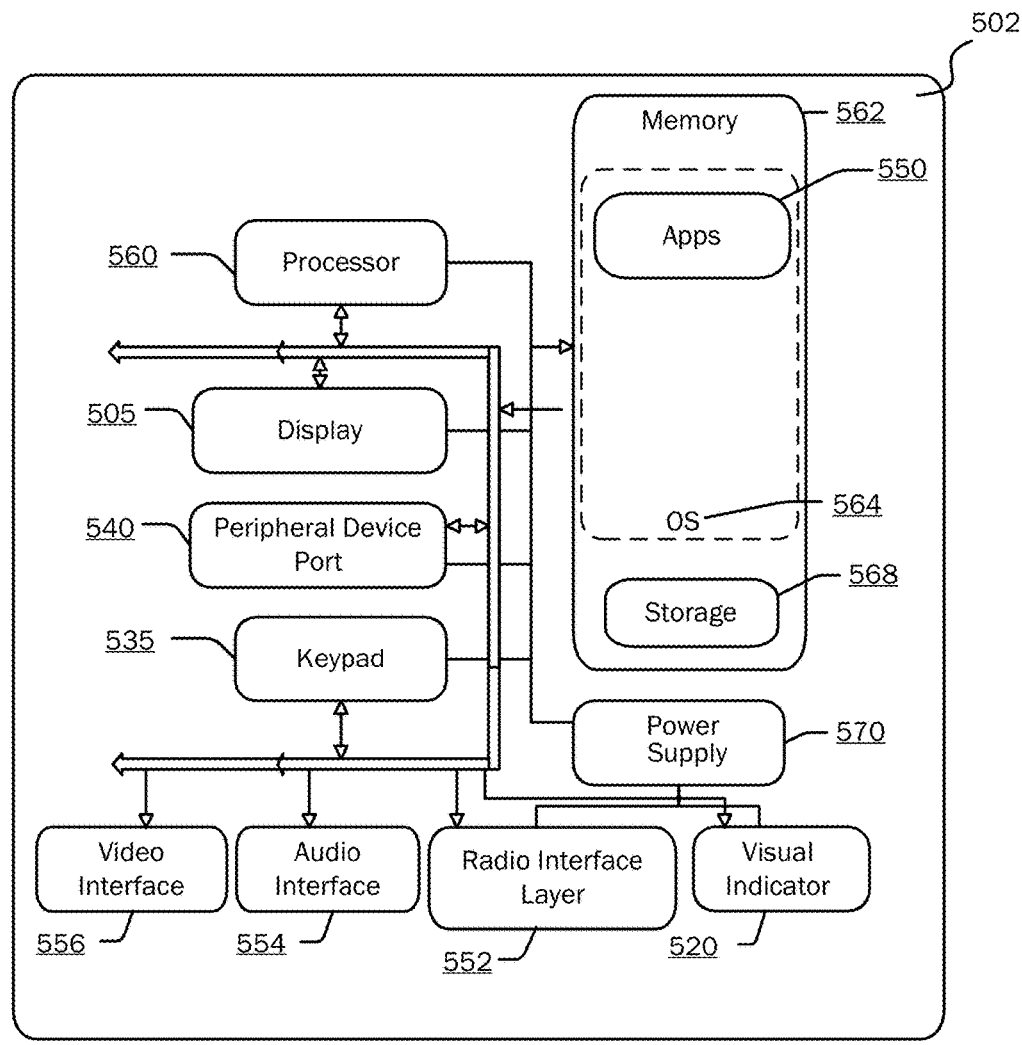

FIGS. 4, 5A, 5B, and the associated descriptions provide a discussion of a variety of operating environments in which examples of the present disclosure are practiced. However, the devices and systems illustrated and discussed with respect to FIGS. 4, 5A, and 5B are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure can be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the software for executing distributed database transactions. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., software for executing distributed database transactions) performs processes including, but not limited to, one or more of the stages of the methods 200A, 200B, and 300 illustrated in FIGS. 2A, 2B, and 3. According to an aspect, other program modules may be used in accordance with examples of the present disclosure and include applications such as electronic mail and contacts applications, word processing applications, spreadsheet applications, database applications, slide presentation applications, drawing or computer-aided application programs, etc.

Aspects of the present disclosure are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery media or transmission media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, software for executing distributed database transactions is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 552 that performs the function of transmitting and receiving radio frequency communications. The radio 552 facilitates wireless connectivity between the system 502 and the "outside world," via a communications carrier or service provider. Transmissions to and from the radio 552 are conducted under control of the operating system 564. In other words, communications received by the radio 552 may be disseminated to the application programs 550 via the operating system 564, and vice versa.

According to an aspect, the visual indicator 520 is used to provide visual notifications and/or an audio interface 554 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 554 is used to provide audible signals to and receive audible signals from the user. For example, in addition to being coupled to the audio transducer 525, the audio interface 554 may also be coupled to a microphone to receive audible input, such as to facilitate a telephone conversation. According to an aspect, the system 502 further includes a video interface 556 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 552 or via a wired connection between the mobile computing device 500 and a separate computing device associated with the mobile computing device 500, for example, a server computer in a distributed computing network, such as the Internet. As should be appreciated, such data/information are accessible via the mobile computing device 500 via the radio 552 or via a distributed computing network. Similarly, according to an aspect, such data/information are readily transferred between computing devices for storage and use according to well-known data/information transfer and storage means, including electronic mail and collaborative data/information sharing systems.

Aspects of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The aspects, examples, and details provided in this application are considered sufficient to convey possession and enable others to make and use the best mode claimed. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for updating data stored by a distributed database system, comprising:
   receiving a distributed transaction at the distributed database system;
   defining a visible change set ID boundary for the distributed database system, the visible change set ID boundary indicating a version of data stored by a plurality of shards of the distributed database system;
   defining a change set ID for the distributed transaction, wherein the change set ID is incrementally larger than the visible change set ID boundary;
   writing data from the distributed transaction to one or more of the plurality of shards in parallel, wherein the one or more shards are append-only; and
   upon a determination that the data from the distributed transaction have been successfully written to each of the one or more shards, advancing the visible change set ID boundary to a new visible change set ID boundary that includes the change set ID for the distributed transaction such that a new version of data stored by the plurality of shards, including the data from the distributed transaction, is accessible.

2. The method of claim 1, further comprising:
   allowing a user to only read stored data defined as within the visible change set ID boundary.

3. The method of claim 1, wherein the change set ID is based at least in part on a date and a time associated with writing the distributed transaction.

4. The method of claim 1, wherein the change set ID is defined at a central database in the distributed database system.

5. The method of claim 1, further comprising:
   organizing all data within each of the one or more shards based on respective change set IDs associated with each stored distributed transaction.

6. The method of claim 1, wherein the visible change set ID boundary is defined and maintained at a central database.

7. The method of claim 1, wherein making the determination that the data have been successfully written to each of the one or more shards comprises receiving a success notice from each of the one or more shards.

8. The method of claim 1, further comprising:
   receiving a read request to the distributed database system before the determination that the data have been successfully written to each of the one or more shards; and
   providing only stored data defined by the visible change set ID boundary.

9. A method for updating data stored by a distributed database system, comprising:
   defining a visible change set ID boundary indicating a version of data stored by a plurality of shards in the distributed database system;
   receiving a first distributed transaction and a second distributed transaction for inclusion in the distributed database system;
   defining a separate change set ID for each of the first distributed transaction and the second distributed transaction;
   writing data from the first distributed transaction and the second distributed transaction to one or more of the plurality of shards in the distributed database system at a parallel rate; and
   upon a determination that the data from the first distributed transaction and the second distributed transaction have been successfully written to each of the one or more shards, advancing the visible change set ID boundary to a new visible change set ID boundary that includes the separate change set ID for each of the first distributed transaction and the second distributed transaction such that a new version of data stored by the plurality of shards, including the data from the first distributed transaction and the second distributed transaction, is accessible.

10. The method of claim 9, wherein the first distributed transaction and the second distributed transaction comprise geographical data items for a mapping application serviced by the distributed database system.

11. The method of claim 9, wherein the change set ID for the first distributed transaction is incrementally larger than the visible change set ID boundary.

12. The method of claim 11, wherein the change set ID for the second distributed transaction is incrementally larger than the change set ID for the first distributed transaction.

13. The method of claim 9, further comprising:
   receiving notice that the second distributed transaction has completed writing prior to the first distributed transaction completely being written; and
   using decision logic to determine how to advance the visible change set ID boundary while the first distributed transaction is still being written.

14. The method of claim 13, wherein the decision logic comprises:
   maintaining the visible change set ID boundary at a current value; and
   providing notification that the data associated with the second distributed transaction is available.

15. The method of claim 13, wherein the decision logic comprises:
   maintaining the visible change set ID boundary at a current value; and
   hiding the data associated with the second distributed transaction from requesting users.

16. The method of claim 13, further comprising:
   receiving notice that the first distributed transaction has completed writing; and
   advancing the visible change set ID boundary to the new visible change set ID boundary that includes the change set ID for the second distributed transaction.

17. A distributed database system for handling updates to data stored by the distributed database system, comprising:
   a plurality of append-only shards each storing data;
   a central database storing a visible change set ID boundary, the visible change set ID boundary indicating a version of data stored by the plurality of append-only shards;

a processor configured to execute instructions, the instructions comprising:
  receiving a distributed transaction at the distributed database system;
  defining a change set ID for the distributed transaction;
  writing data from the distributed transaction to one or more of the plurality of append-only shards in the distributed database system in parallel; and
  upon a determination that the data have been successfully written to each of the one or more append-only shards, advancing the visible change set ID boundary to a new visible change set ID boundary that includes the change set ID for the distributed transaction such that a new version of data stored by the plurality of append-only shards, including the data from the distributed transaction, is accessible.

18. The distributed database system of claim 17, wherein the one or more append-only shards are append-only databases.

19. The distributed database system of claim 17, wherein the one or more append-only shards are located remotely from one another.

20. The distributed database system of claim 17, wherein the central database tracks all change set IDs.

\* \* \* \* \*